(12) United States Patent
Sauerteig et al.

(10) Patent No.: US 11,600,869 B2
(45) Date of Patent: *Mar. 7, 2023

(54) BATTERY PACK AND TREATMENT SYSTEM

(71) Applicants: Andreas Stihl AG & Co. KG, Waiblingen (DE); Murata Manufacturing Co., Ltd., Nagaokakyo (JP)

(72) Inventors: Daniel Sauerteig, Kernen im Remstal (DE); Julien Scholl, Waiblingen (DE); Kenichi Ozawa, Koriyama (JP); Takayuki Sato, Koriyama (JP); Daiki Misawa, Koriyama (JP); Yosuke Kono, Koriyama (JP); Masaki Kuratsuka, Koriyama (JP)

(73) Assignees: Andreas Stihl AG & Co. KG, Waiblingen (DE); Murata Manufacturing Co., Ltd., Nagaokakyo (JP)

(*) Notice: Subject to any disclaimer, the term of this patent is extended or adjusted under 35 U.S.C. 154(b) by 218 days.

This patent is subject to a terminal disclaimer.

(21) Appl. No.: 16/870,153

(22) Filed: May 8, 2020

(65) Prior Publication Data

US 2020/0358145 A1 Nov. 12, 2020

(30) Foreign Application Priority Data

May 10, 2019 (EP) ...................................... 19173780

(51) Int. Cl.
*H01M 10/48* (2006.01)
*H01M 10/6235* (2014.01)
(Continued)

(52) U.S. Cl.
CPC ..... *H01M 10/482* (2013.01); *H01M 10/0585* (2013.01); *H01M 10/48* (2013.01);
(Continued)

(58) Field of Classification Search
CPC .. H01M 10/482; H01M 10/48; H01M 10/486; H01M 10/6235; H01M 50/247;
(Continued)

(56) References Cited

U.S. PATENT DOCUMENTS 9,793,581 B2 10/2017 Henrici et al.
2013/0196196 A1* 8/2013 Obeidi ................ H01M 10/482
429/82

(Continued)

FOREIGN PATENT DOCUMENTS

DE 10 2012 207 999 A1 11/2013
DE 10 2015 208 252 A1 11/2016
(Continued)

OTHER PUBLICATIONS

"LiFePO4 Battery Pack 12.8V 28Ah", AntBatt, <https://antbatt.com/portfolio-items/lifepo4-battery-12-8v28ah/> (Year: 2017).*
(Continued)

*Primary Examiner* — Matthew T Martin
*Assistant Examiner* — Jessie L. Walls
(74) *Attorney, Agent, or Firm* — Crowell & Moring LLP

(57) ABSTRACT

A battery pack supplies an electrically driven treatment apparatus with an electric driving power and includes: a first stack limiting structure and a second stack limiting structure, wherein the second stack limiting structure is disposed opposite and with a fixed distance to the first stack limiting structure; a plurality of pouch cells, wherein the pouch cells are disposed in a stack, wherein the stack is disposed between the first stack limiting structure and the second stack limiting structure and a height of the stack in a stack
(Continued)

direction is limited by the first stack limiting structure and the second stack limiting structure; and a sensor arrangement. The sensor arrangement is disposed in the stack. The sensor arrangement extends across a major part of a surface of the pouch cells and is configured such that the height of the stack across the extension is approximately equal. The sensor arrangement has a pressure sensor. The pressure sensor is configured for detecting a pressure force acting in the stack direction on the pouch cells.

14 Claims, 12 Drawing Sheets

(51) Int. Cl.
| | | |
|---|---|---|
| H01M 50/247 | (2021.01) | |
| H01M 50/211 | (2021.01) | |
| H01M 10/0585 | (2010.01) | |
| H01M 10/42 | (2006.01) | |
| H01M 50/209 | (2021.01) | |
| H01M 50/569 | (2021.01) | |

(52) U.S. Cl.
CPC ..... *H01M 10/486* (2013.01); *H01M 10/6235* (2015.04); *H01M 50/209* (2021.01); *H01M 50/211* (2021.01); *H01M 50/247* (2021.01); *H01M 50/569* (2021.01); *H01M 2010/4278* (2013.01); *H01M 2220/30* (2013.01)

(58) Field of Classification Search
CPC ....... H01M 50/569; H01M 2010/4278; H01M 2220/30; H01M 50/211
See application file for complete search history.

(56) References Cited

U.S. PATENT DOCUMENTS

| | | | |
|---|---|---|---|
| 2015/0255834 A1* | 9/2015 | Engle | H01M 10/425 |
| | | | 429/90 |
| 2015/0340744 A1* | 11/2015 | Knobloch | G01R 31/367 |
| | | | 429/61 |
| 2016/0141728 A1 | 5/2016 | Fauteux et al. | |
| 2016/0276720 A1* | 9/2016 | Steil | H01M 10/486 |
| 2017/0338535 A1* | 11/2017 | Bhoir | H01M 10/482 |
| 2018/0062127 A1 | 3/2018 | Lee et al. | |
| 2020/0076016 A1* | 3/2020 | Riemer | H01M 10/486 |

FOREIGN PATENT DOCUMENTS

| | | | | |
|---|---|---|---|---|
| KR | 10-2016-0032843 A | | 3/2016 | |
| WO | WO-2017222375 A1 | * | 12/2017 | ............ H01M 10/04 |

OTHER PUBLICATIONS

Colin Dedman, "Less noise, No. fumes: Testing cordless leaf blowers"; Source: ReNew: Technology fora Sustainable Future, No. 136, Australian-Made Special (Jul.-Sep. 2016), pp. 81-83; Published by: Alternative Technology Association (Year: 2016).*

* cited by examiner

BATTERY PACK AND TREATMENT SYSTEM

FIELD OF APPLICATION AND PRIOR ART

The invention relates to a battery pack for supplying an electrically driven treatment apparatus with electric driving power and to a treatment system including such a battery pack and to an electrically driven treatment apparatus.

Problem and Solution

The invention is based on the problem of providing a battery pack for supplying an electrically driven treatment apparatus with electric driving power, wherein the battery pack has improved properties, in particular a comparatively long service life, and a treatment system including such a battery pack and an electrically driven treatment apparatus.

The invention solves the problem by providing a battery pack and by providing a treatment system according to the claimed invention. Advantageous developments and/or configurations of the invention are described and claimed herein.

The battery pack according to the invention is designed or configured for supplying, in particular automatic supplying, of an electrically driven treatment apparatus, in particular a treatment apparatus for gardening, forestry and/or building construction, with electric driving power. The battery pack comprises a first stack limiting structure, a second stack limiting structure, a plurality of pouch cells and a sensor arrangement. The second stack limiting structure is disposed opposite to and with a fixed distance to the first stack limiting structure. The pouch cells are disposed in a stack, in particular one on top of the other or superimposed. The stack is disposed between the first stack limiting structure and the second stack limiting structure. A height of the stack in a stack direction is limited by the first stack limiting structure and the second stack limiting structure, in particular the fixed distance thereof. The sensor arrangement is disposed in the stack. Furthermore, the sensor arrangement extends across a major part of a surface of the pouch cells and is designed or configured such that the height of the stack across the extension is approximately equal. Moreover, the sensor arrangement has a pressure sensor, in particular an electric pressure sensor. The pressure sensor is designed or configured for detecting, in particular automatic detecting, in particular measuring, of a pressure force acting in the stack direction on the pouch cells.

The pressure sensor allows detecting, in particular measuring, of an inflation, where present, of the pouch cells in the stack direction. In particular, inflation together with the limited height of the stack can cause build-up of the pressure force.

Furthermore, the extension across the major part of the surface of the pouch cells and the approximately equal height of the stack across the extension allow an effect, in particular disadvantageous effect, of the sensor arrangement on the pouch cells, in particular flexible outer shells of the pouch cells, to be kept low or even prevented completely. In particular, a deformation, in particular local deformation, and thus an exposure, in particular local exposure, of the pouch cells can be kept low or even prevented completely.

This allows a comparatively long service life of the pouch cells, and thus of the battery pack.

In particular, a fixed distance can mean that the distance between the first stack limiting structure and the second stack limiting structure can vary only to a minor extent or not at all, as compared to cell thicknesses of the pouch cells in the stack direction, in particular during an inflation of the pouch cells. In addition or as an alternative, the second stack limiting structure can be arranged, in particular with a main plane, parallel to the first stack limiting structure, in particular a main plane of the first stack limiting structure.

The pouch cells can be configured for supplying the treatment apparatus with the driving power. In addition or as an alternative, the pouch cells can be accumulator cells or battery cells, or can be in each case individual rechargeable storage elements for electric energy working on an electrochemical basis. In particular, the pouch cells can be lithium-ion accumulator cells. Further in addition or as an alternative, the pouch cells can be electrically interconnected, in particular can be connected in series or in parallel. Further in addition or as an alternative, the pouch cells can be flat cells. Further in addition or as an alternative, the surface of the pouch cells can be rectangular. Further in addition or as an alternative, the pouch cells can be similar or identical, in particular of the same type and/or the same construction. Further in addition or as an alternative, the stack can be cuboid in shape.

The pouch cells can be arranged in the stack with a respective main plane in parallel to each other and/or orthogonal to the stack direction and/or parallel to the first stack limiting structure, in particular a main plane of the first stack limiting structure, and/or parallel to the second stack limiting structure, in particular a main plane of the second stack limiting structure. In addition or as an alternative, the stack can be arranged with the stack direction orthogonal to the first stack limiting structure, in particular a main plane of the first stack limiting structure, and/or the second stack limiting structure, in particular a main plane of the second stack limiting structure. Further in addition or as an alternative, the distance can be in the stack direction. Further in addition or as an alternative, the height can correspond to the distance, in particular be equal thereto.

The sensor arrangement can be arranged at the very top of the stack, or on an upper side of the stack, or right down in the stack, or on a bottom side of the stack. In addition or as an alternative, a major part of the surface can mean at least 70 percent (%), in particular at least 80%, in particular at least 90% of the surface. In particular, the sensor arrangement can extend across the entire surface of the pouch cells. Further in addition or as an alternative, the sensor arrangement can have certain gaps across the extension. Further in addition or as an alternative, approximately equal can mean a variance of a maximum of 5%, in particular of a maximum of 2%, in particular of a maximum of 1%. Further in addition or as an alternative, the height across the extension can be equal or homogeneous. Further in addition or as an alternative, the sensor arrangement can be arranged and configured between one of the stack limiting structures and one of the pouch cells or between two of the pouch cells such that a distance between the stack limiting structure and the pouch cell, or between the two pouch cells can be approximately equal across the extension. Further in addition or as an alternative, the sensor arrangement can have an arrangement thickness in the stack direction across the extension that is equal, in particular approximately equal, in particular constant. Further in addition or as an alternative, the sensor arrangement can be rectangular.

The pressure sensor can be configured for detecting the pressure force acting orthogonal to the surface and/or the main planes on the pouch cells. In addition or as an alternative, the pressure sensor can be configured for qualitative detection of the pressure force, in particular as a mechanical switch, or even for quantitative measurement of the pressure force, in particular a value of the pressure force.

In a development of the invention, the sensor arrangement has a one piece or integral design or configuration. In particular, the sensor arrangement can have an equal, in particular constant, arrangement thickness in the stack direction across the extension.

In a development of the invention, the sensor arrangement has a compensation spacer. The compensation spacer is disposed in the stack. Furthermore, the compensation spacer is designed or configured separate from the pressure sensor. Moreover, the compensation spacer has a sensor recess. The pressure sensor is disposed or received in the sensor recess. A spacer thickness of the compensation spacer and a sensor thickness of the pressure sensor in the stack direction are approximately equal. The spacer thickness allows compensating of the sensor thickness. In particular, the sensor thickness can be equal to or somewhat greater than the spacer thickness, e.g. 0.1 millimeters. What is enabled thereby is that, with tolerances, the pressure sensor can be flush with the compensation spacer. In addition or as an alternative, the sensor arrangement can have a multicomponent or multipart design.

In a development of the invention, the sensor arrangement includes a film, in particular is a film. In particular in case of a design of the sensor arrangement in one piece, said arrangement can be a film. In addition or as an alternative, in case of a design of the sensor arrangement in multiple parts, the compensation spacer and/or the pressure sensor can, in particular each, be a film.

In a development of the invention, the sensor arrangement has a temperature sensor, in particular an electrical and/or inner temperature sensor. The temperature sensor is designed or configured for measuring, in particular automatic measuring, of a temperature, in particular an inner temperature, in particular a value of the temperature, of the stack. The sensor arrangement allows a synergy effect. In particular, the temperature sensor, in particular the inner temperature sensor, can be a negative temperature coefficient thermistor.

In a development of the invention, the sensor arrangement is disposed between two, in particular central in the stack direction, of the pouch cells.

In addition or as an alternative, the pressure sensor and/or the temperature sensor, in particular the inner temperature sensor, where present, are/is disposed in a center of the surface of the pouch cells. This allows detecting, in particular measuring, at a location where the pressure force is greatest and/or the temperature, in particular the inner temperature, can be highest or hottest.

In particular, in a center can mean closer to the center than to an edge, in particular spaced from the center at a maximum of 20 millimeters (mm), in particular a maximum of 10 mm, in particular a maximum of 5 mm.

In a development of the invention, the battery pack has a temperature sensor, in particular an electrical and/or outer temperature sensor. The outer temperature sensor is disposed and designed or configured for measuring, in particular automatic measuring, of an outer temperature, in particular a value of the temperature, of the stack outside the stack at a border or an edge, in particular a corner, of the stack, of the first stack limiting structure or the second stack limiting structure, and/or outside the first stack limiting structure or the second stack limiting structure. This allows measuring at a location where the outer temperature can be lowest or coldest. In particular, the outer temperature sensor can be different from the inner temperature sensor, where present. In addition or as an alternative, the outer temperature sensor can be disposed on an edge, in particular a corner, of an outermost one of the pouch cells. In addition or as an alternative, on an edge or a corner can mean closer to the edge or the corner than to a center, in particular spaced from the edge or corner at a maximum of 20 millimeters (mm), in particular a maximum of 10 mm, in particular a maximum of 5 mm. Further in addition or as an alternative, the outer temperature sensor can be a negative temperature coefficient thermistor.

In a development of the invention, the battery pack has a control device, in particular an electrical control device. The control device is designed or configured for controlling, in particular automatic controlling, of the battery pack in response to the detected, in particular measured, pressure force and/or the measured, in particular inner, temperature, where present, and/or the measured outer temperature, where present. This allows to keep safety-critical conditions of the pouch cells, and thus of the battery pack, low or even prevent them at all. In particular, the control device can be configured for controlling, in particular stopping, the output of electric driving power from the battery pack and/or an input of electric charging power to the battery pack. In addition or as an alternative, the control device can be configured for detecting a state of health of the battery pack as a function of the pressure force and/or the temperature, in particular inner temperature, and/or the outer temperature and for controlling the battery pack in response to the detected state of health.

In a development of the invention, the battery pack has a power output and/or power input detection device, in particular an electrical power output and/or power input detection device. The power output and/or power input detection device is designed or configured for detecting, in particular automatic detecting, of the output electric driving power from the battery pack, and/or an electric charging power, in particular the electric charging power, input to the battery pack over time. The control device is designed or configured for comparison, in particular automatic comparison, of the detected, in particular measured, pressure force and/or a quantity based on the detected pressure force to a variable pressure limit value and for controlling, in particular automatic controlling, of the battery pack in response to a result of the comparison. Furthermore, the control device is designed or configured for varying, in particular automatic varying, in particular increasing, of the pressure limit value in response to the detected output driving power and/or the detected input charging power over time. This allows a slight, in particular uncritical, inflating, where present, of the pouch cells caused by, in particular use-related, aging to be taken into account. In particular, the pressure limit value of at least one of the pouch cells can be predetermined. In addition or as an alternative, the control device can be configured for controlling, in particular stopping, of the output of electric driving power from the battery pack and/or the input of electric charging power to the battery pack upon reaching or exceeding the pressure limit value by the detected, in particular measured, pressure force and/or the quantity based on the detected pressure force.

In a development of the invention, the battery pack has at least one buffer element. The at least one buffer element is disposed in the stack. Furthermore, the at least one buffer element extends across a major part of the surface of the pouch cells and is designed or configured to buffer inflating, where present, of the pouch cells in the stack direction across a buffer thickness of the at least one buffer element. This allows a slight, in particular uncritical, inflating, where present, of the pouch cells caused by aging to be absorbed or compensated. In particular, the at least one buffer element can include, in particular be, a foamed material, in particular sponge rubber. In addition or as an alternative, the at least one buffer element can be a thermal insulation, wherein the at least one thermal insulation can be arranged respectively between two of the pouch cells.

In a development of the invention, the battery pack has a stack housing, in particular a massive stack housing. The first stack limiting structure is a first housing wall of the stack housing and the second stack limiting structure is a second housing wall of the stack housing. In case of bursting of the pouch cells, this feature allows mechanical stress of surrounding parts to be kept low or even prevented completely. In particular, the stack housing can be cuboid in shape. In addition or as an alternative, the stack housing can be partially or even completely made of aluminum.

In a development of the invention, the battery pack has, in particular the pouch cells have, a maximum electric driving power of a minimum of 1 kilowatt (kW), in particular a minimum of 2 kW, and/or of a maximum of 10 kW, in particular a maximum of 5 kW.

In addition or as an alternative, the battery pack has, in particular the pouch cells have, a nominal voltage, in particular electrical nominal voltage, of a minimum of 10 Volts (V), in particular a minimum of 20 V, and/or of a maximum of 100 V, in particular a maximum of 50 V.

In addition or as an alternative, the battery pack has, in particular the pouch cells have, a maximum energy content, in particular electrical energy content, of a minimum of 100 Watt hours (Wh), in particular a minimum of 200 Wh, and/or of a maximum of 1000 Wh, in particular a maximum of 500 Wh.

In addition or as an alternative, the battery pack has a mass of a minimum of 0.5 kilograms (kg), in particular a minimum of 1 kg, and/or of a maximum of 10 kg, in particular a maximum of 5 kg.

In addition or as an alternative, the battery pack has a height, in particular in the stack direction, of a minimum of 2.5 centimeters (cm) and/or of a maximum of 10 cm, and/or a width of a minimum of 5 cm and/or of a maximum of 20 cm, and/or a depth of a minimum of 7.5 cm and/or of a maximum of 30 cm.

The treatment system according to the invention comprises a battery pack, in particular the battery pack, as described above and an electrically driven treatment apparatus, in particular the electrically driven treatment apparatus. The battery pack and the treatment apparatus are designed or configured for electrical connection with each other for supplying, in particular automatic supplying, of the treatment apparatus with electric driving power from the battery pack.

In particular, the treatment system can be a treatment system for gardening, forestry and/or building construction. In addition or as an alternative, the treatment apparatus can be a treatment apparatus for gardening, forestry and/or building construction. Further in addition or as an alternative, the treatment apparatus can be a hand-guided, in particular floor-guided or hand-held, treatment apparatus. In particular hand-guided, in particular hand-held, treatment apparatus can mean that the treatment apparatus can have a maximum mass of 50 kilograms (kg), in particular of 20 kg, in particular of 10 kg. Further in addition or as an alternative, the treatment apparatus can include an electric drive motor. Further in addition or as an alternative, the battery pack and the treatment apparatus can be designed for detachable electrical connection with each other, in particular without using a tool and/or without destruction, particularly by using plug connectors. Further in addition or as an alternative, the battery pack and the treatment apparatus can be designed for, in particular detachable, mechanical connection with each other, in particular without using a tool and/or detachable without destruction. In particular, the treatment apparatus can be designed for holding the battery pack.

In a development of the invention, the treatment apparatus has a battery accommodation, in particular a battery compartment. The battery accommodation is designed or configured for accommodating the battery pack.

In a development of the invention, the treatment apparatus is a saw, a pole pruner, a clearing saw, a brush cutter, hedge shears, a hedge cutter, a blower device, a leaf blower, a lopper, a cutoff grinder, a sweeper device, a sweeper roller, a sweeper brush, a lawn mower, a dethatcher, or a grass trimmer.

BRIEF DESCRIPTION OF THE DRAWINGS

Further advantages and aspects of the invention can be gathered from the claims and from the following description of preferred exemplary embodiments of the invention, which will be explained hereinbelow with reference to the figures. Therein:

DETAILED DESCRIPTION OF THE EXEMPLARY EMBODIMENTS

Figure 4:
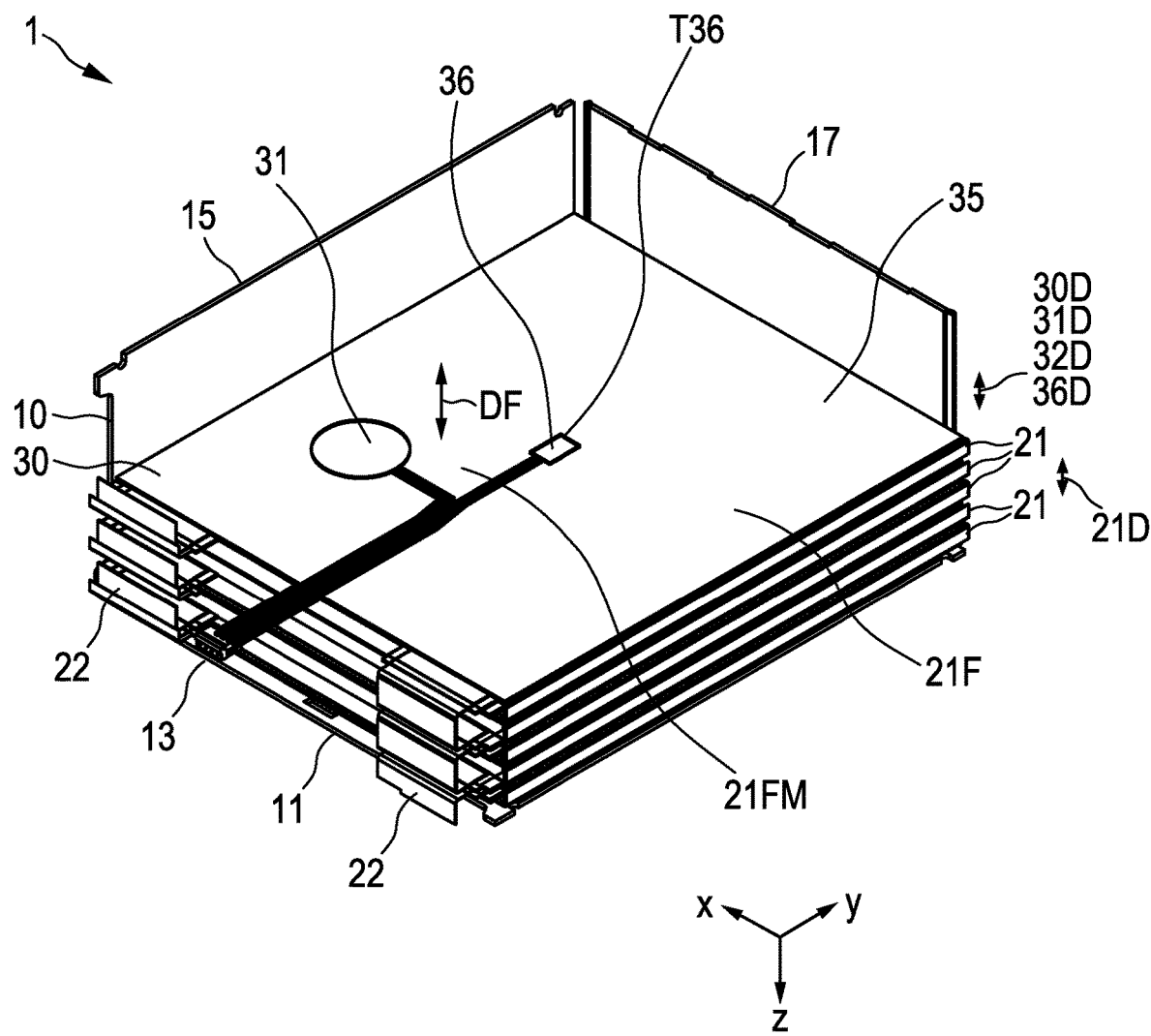
FIG. 4 shows a perspective view of the first stack limiting structure, of pouch cells and a sensor arrangement of the battery pack from FIG. 1.
Figure 5:
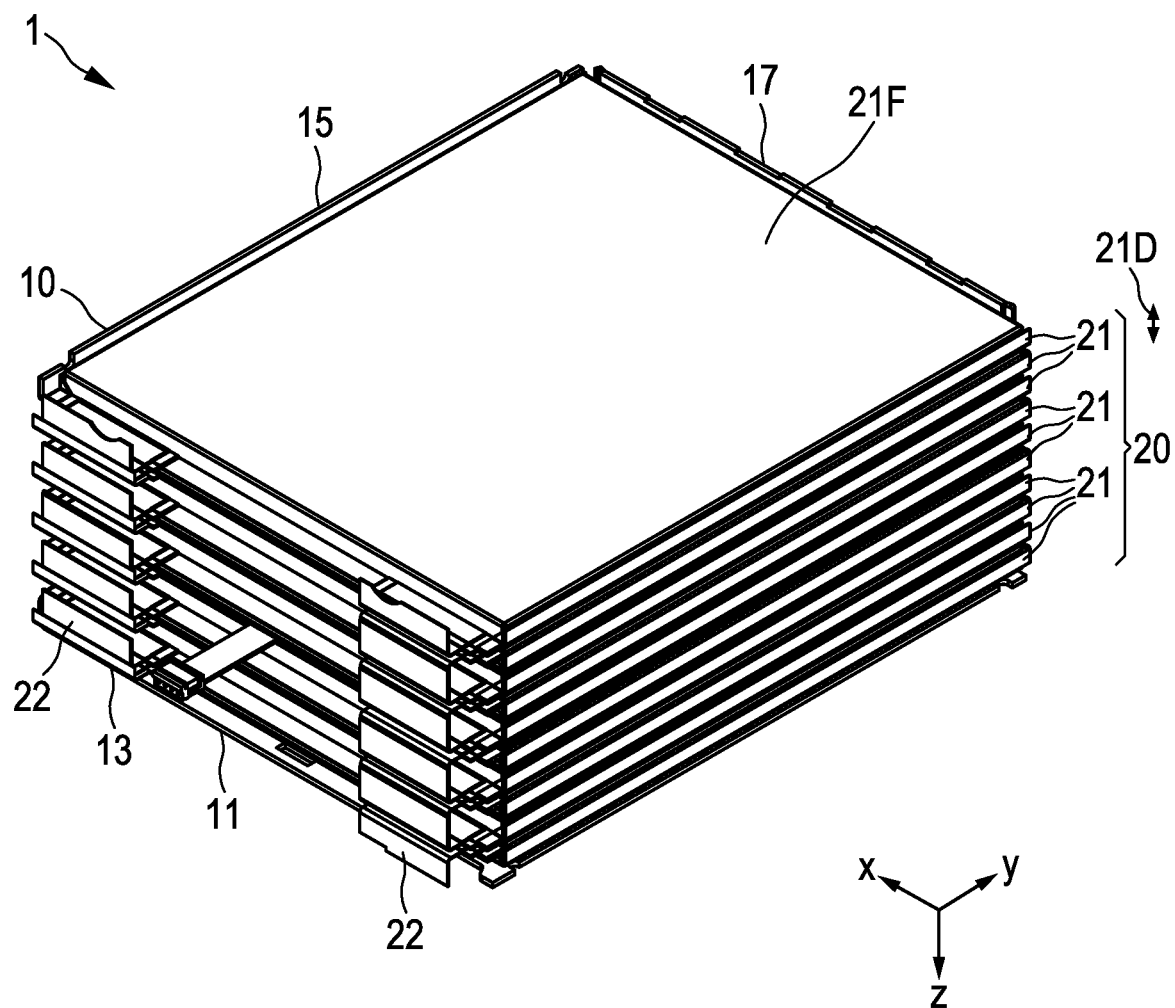
FIG. 5 shows a perspective view of the first stack limiting structure, of pouch cells and the sensor arrangement disposed in a stack of the battery pack from FIG. 1.
Figure 6:
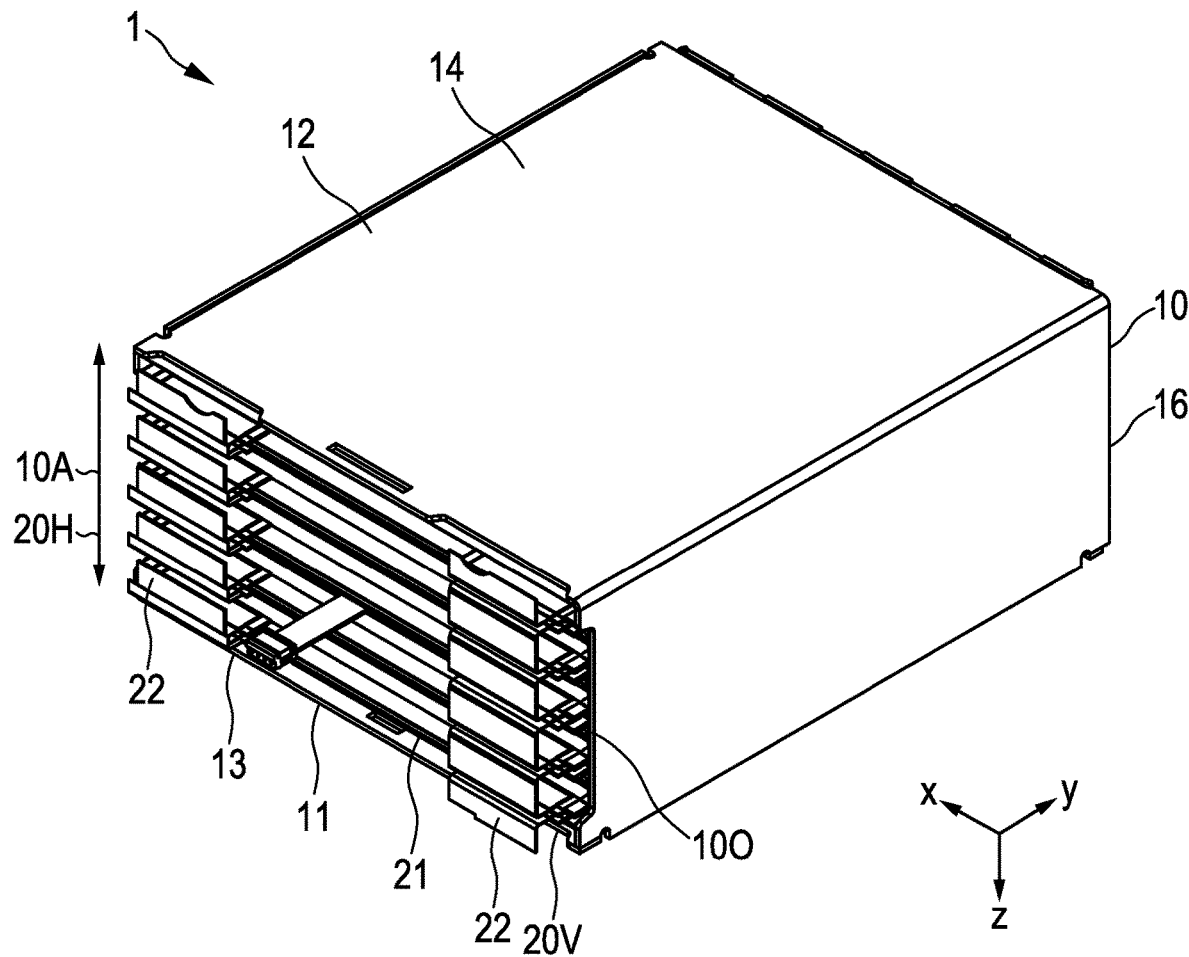
FIG. 6 shows a perspective view of the first stack limiting structure, the stack and a second stack limiting structure of the battery pack from FIG. 1.

FIGS. 1 to 12 show a battery pack 1 for supplying an electrically driven treatment apparatus 101 with an electric driving power AL. The battery pack 1 comprises a first stack limiting structure 13, a second stack limiting structure 14, a plurality of pouch cells 21 and a sensor arrangement 30. The second stack limiting structure 14 is disposed opposite to and with a fixed distance 10A to the first stack limiting structure 13, as illustrated in FIG. 6. The pouch cells 21 are disposed in a stack 20, as illustrated in FIG. 5. The stack 20 is disposed between the first stack limiting structure 13 and the second stack limiting structure 14. A height 20H of the stack 20 in a stack direction z is limited by the first stack limiting structure 13 and the second stack limiting structure 14. The sensor arrangement 30 is disposed in the stack 20, as illustrated in FIG. 4. Furthermore, the sensor arrangement 30 extends across a major part of a surface 21F of the pouch cells 21 and is configured such that the height 20H of the stack 20 across the extension is approximately equal. Moreover, the sensor arrangement 30 has a pressure sensor 31. The pressure sensor 31 is configured for detecting, in particular measuring, a pressure force DF acting in the stack direction z on the pouch cells 21.

In the exemplary embodiment shown, the battery pack 1 includes ten pouch cells 21. In alternative exemplary embodiments, the battery pack can include at least two pouch cells.

Further, in the exemplary embodiment shown, the first stack limiting structure 13 and the second stack limiting structure 14 extend respectively in directions x, y orthogonal to the stack direction z. Additionally, in the exemplary embodiment shown, the distance 10A is in the stack direction z. Furthermore, in the exemplary embodiment shown, the height 20H is equal to the distance 10A. Moreover, in the exemplary embodiment shown, the pouch cells 21 extend respectively in the directions x, y orthogonal to the stack direction z.

Further, in the exemplary embodiment shown, the sensor arrangement 30 extends in the directions x, y orthogonal to the stack direction z. Additionally, in the exemplary embodiment shown, the sensor arrangement 30 extends across the complete surface 21F of the pouch cells 21. Furthermore, in the exemplary embodiment shown, the sensor arrangement 30 has an equal arrangement thickness 30D in the stack direction z across the extension.

In the illustration of FIGS. 1 to 11, the sensor arrangement 30 is in one piece.

Figure 12:
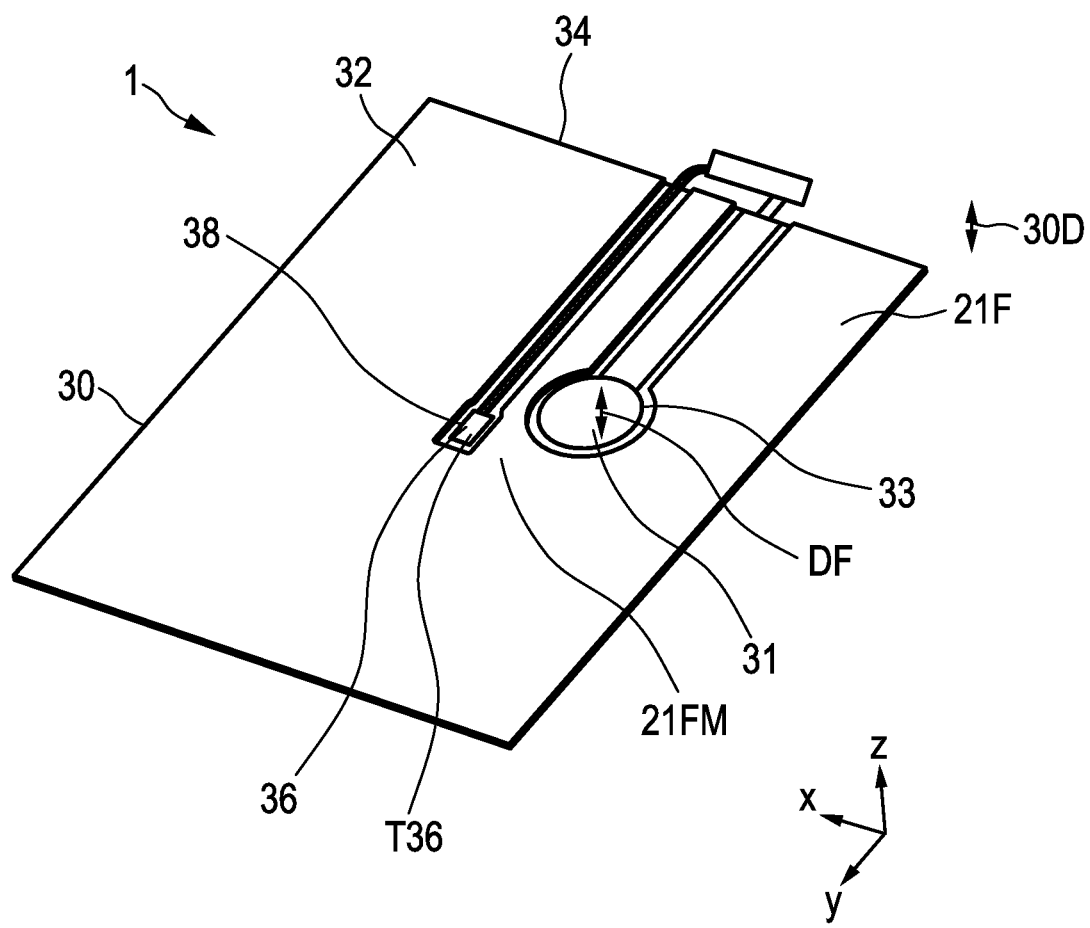
FIG. 12 shows an alternative sensor arrangement of the battery pack from FIG. 1.

In FIG. 12, the sensor arrangement 30 has a compensation spacer 32. The compensation spacer 32 is disposed in the stack 20. Furthermore, the compensation spacer 32 is separate from the pressure sensor 31. Moreover, the compensation spacer 32 has at least one sensor recess 33, 38. The pressure sensor 31 is disposed in the sensor recess 33. A spacer thickness 32D of the compensation spacer 32 and a sensor thickness 31D of the pressure sensor 31 in the stack direction z are approximately equal.

Further, in FIGS. 1 to 11, the sensor arrangement 30 is a film 35. In FIG. 12, the sensor arrangement 30 has a film 34, in particular the compensation spacer 32 is the film 34.

Additionally, the sensor arrangement 30 has a temperature sensor 36, in particular an inner temperature sensor 36, as illustrated in FIGS. 4 and 12. The temperature sensor 36 is configured for measuring a temperature T36, in particular an inner temperature T36, of the stack 20.

In FIG. 12, the inner temperature sensor 36 is disposed in the sensor recess 38. A sensor thickness 36D of the inner temperature sensor 36 is approximately equal to the spacer thickness 32D of the compensation spacer 32 and the sensor thickness 31D of the pressure sensor 31 in the stack direction z.

Furthermore, the sensor arrangement 30 is disposed between two of the pouch cells 21, central in the stack direction z, in the exemplary embodiment illustrated.

Additionally, the pressure sensor 31 and the temperature sensor 36, in particular inner temperature sensor 36, are disposed in a center 21FM of the surface 21F of the pouch cells 21.

In other words: the pressure sensor 31 and the, in particular inner, temperature sensor 36 are disposed at a point of intersection of the diagonals of the stack 20.

Figure 9:
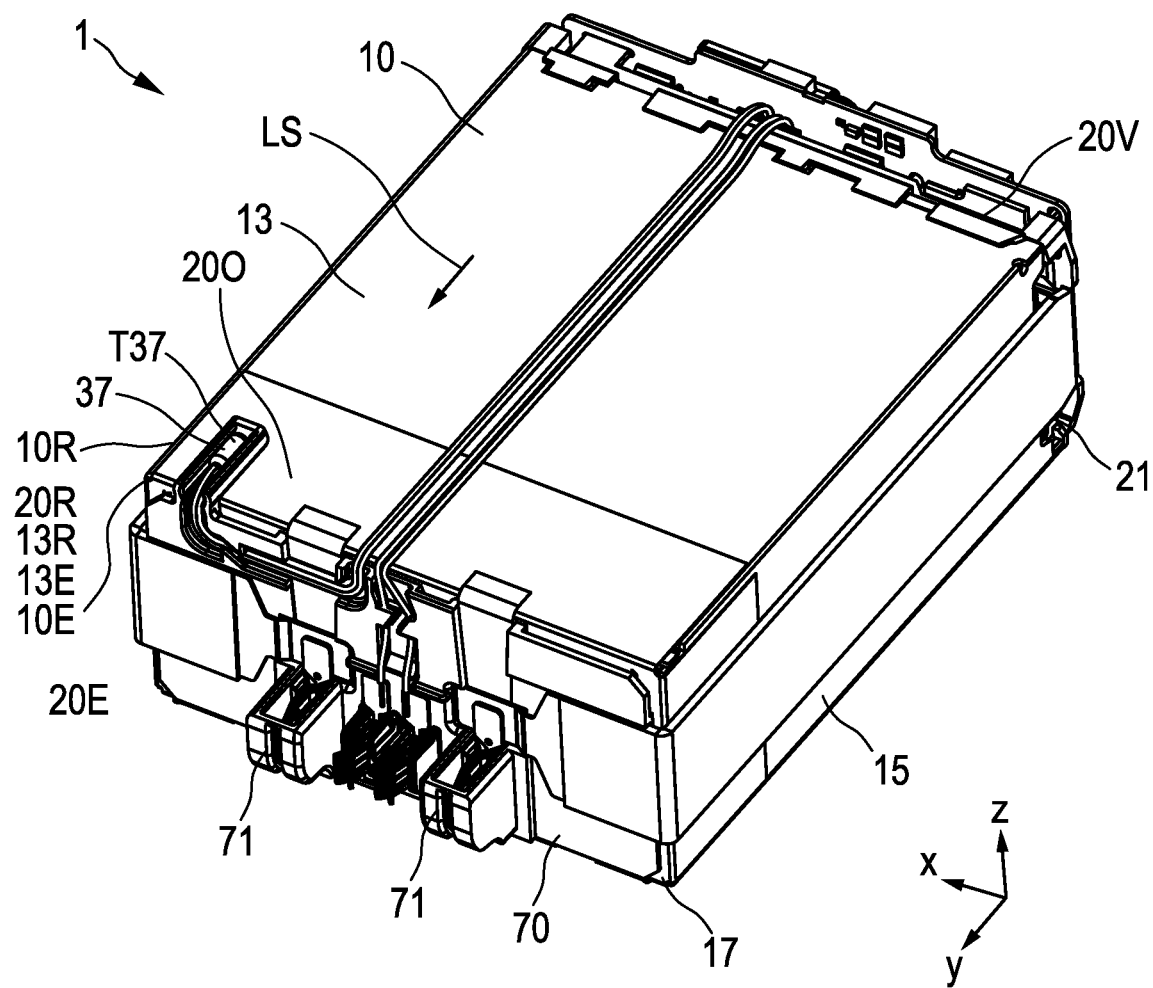
FIG. 9 shows a perspective view of a rear side of the first stack limiting structure, the stack, the second stack limiting structure, the control device and an outer temperature sensor of the battery pack from FIG. 1.
Figure 10:
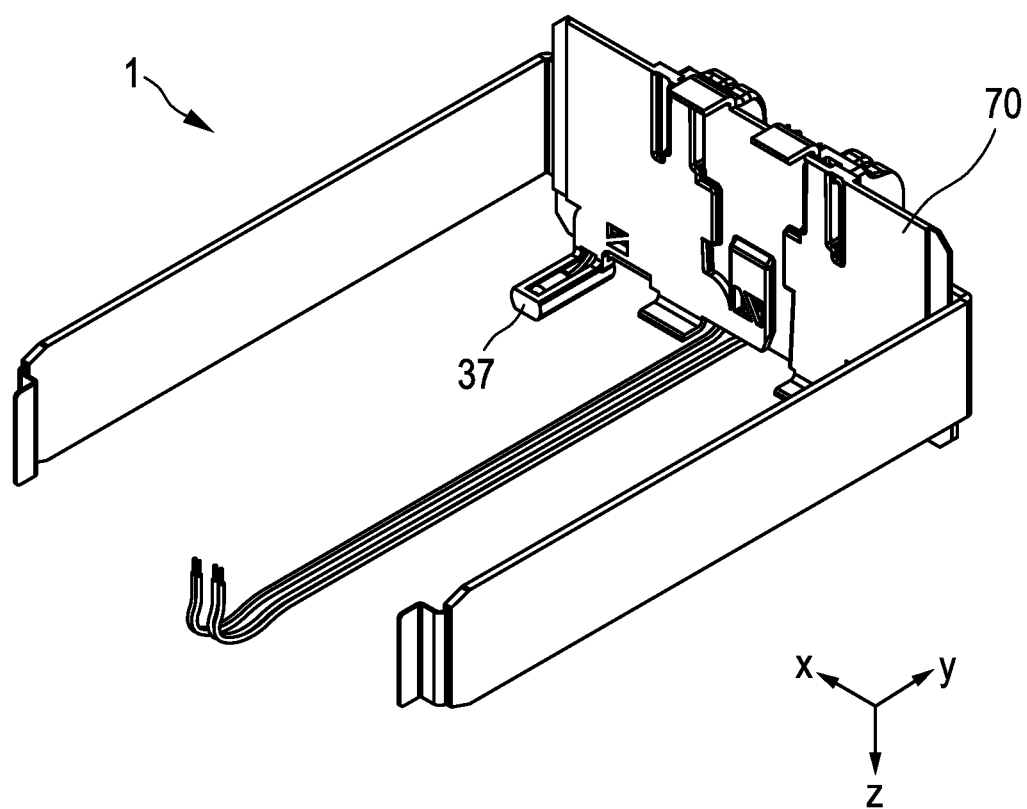
FIG. 10 shows a perspective view of the outer temperature sensor and a battery pack contact support of the battery pack from FIG. 1.

Moreover, the battery pack comprises an outer temperature sensor 37, as illustrated in FIGS. 9 and 10. The outer temperature sensor 37 is disposed and configured for measuring an outer temperature T37 of the stack 20 outside the stack 20 at an edge 20R, 13R, in particular a corner 20E, 13E, of the stack 20 or the first stack limiting structure 13 and/or outside the first stack limiting structure 13.

In alternative exemplary embodiments, the outer temperature sensor can be disposed on an edge, in particular a corner, of the second stack limiting structure and/or outside the second stack limiting structure.

Figure 7:
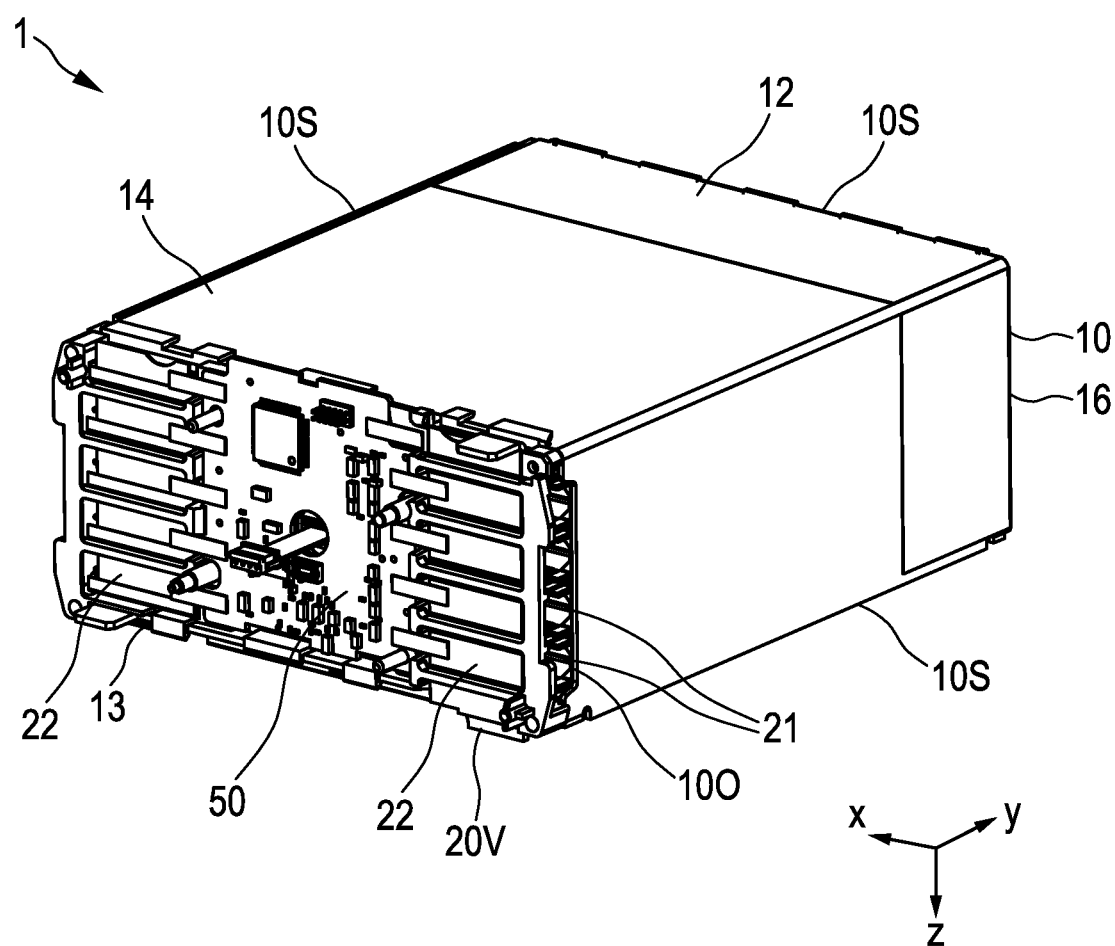
FIG. 7 shows a perspective view of the first stack limiting structure, the stack, the second stack limiting structure and a part of a control device of the battery pack from FIG. 1.
Figure 8:
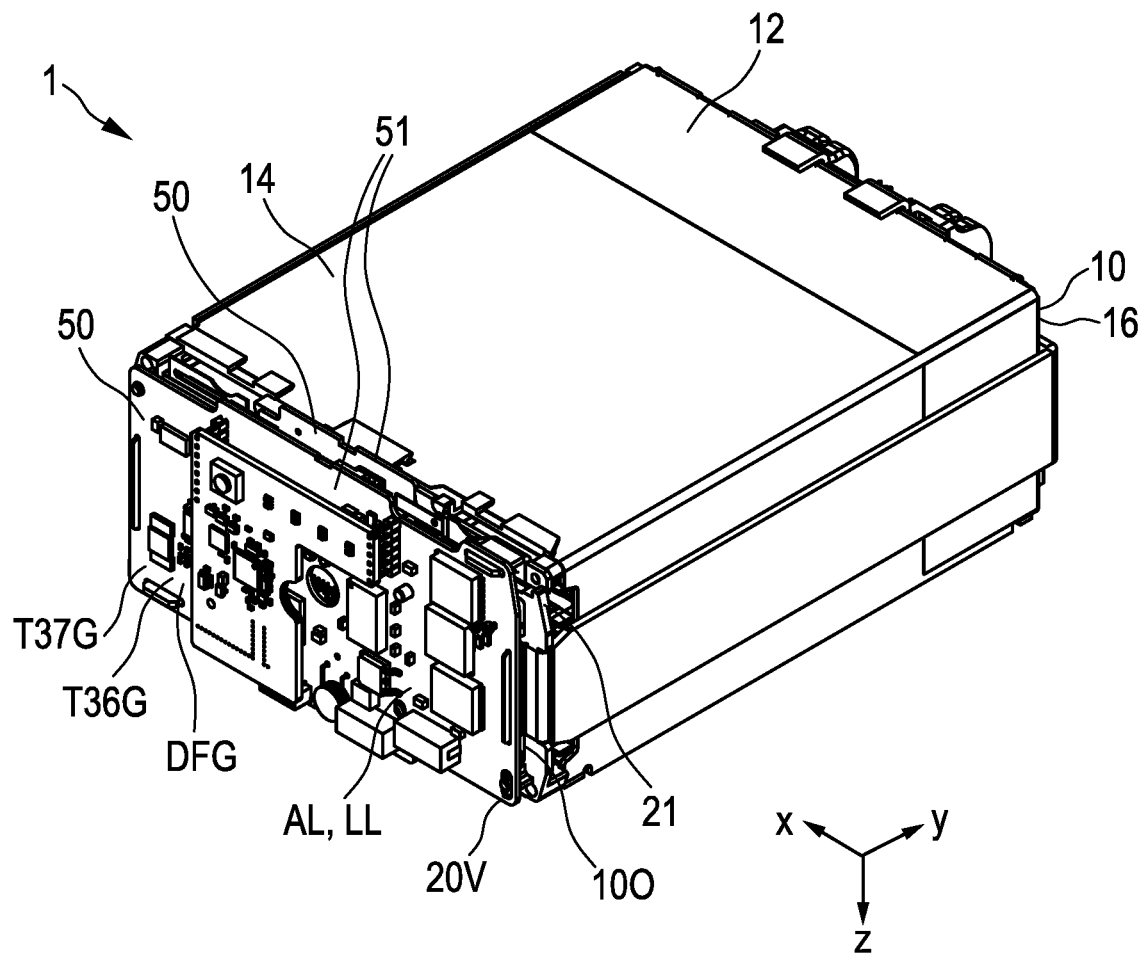
FIG. 8 shows a perspective view of the first stack limiting structure, the stack, the second stack limiting structure and the control device of the battery pack from FIG. 1.

Further, the battery pack 1 comprises a control device 50, as illustrated in FIGS. 7 and 8. The control device 50 is configured for controlling the battery pack 1 in response to the detected, in particular measured, pressure force DF and the measured, in particular inner, temperature T36 and the measured outer temperature T37.

Particularly, the control device 50 is electrically connected, in particular in each case, to the pressure sensor 31, to the temperature sensor 36, in particular inner temperature sensor 36, and the outer temperature sensor 37.

Furthermore, in the exemplary embodiment shown, the control device 50 is configured for measuring voltages of the pouch cells 21 and for controlling the battery pack 1 in response to the measured voltages. In particular, the control device 50 is electrically connected to the pouch cells 21, in particular cell tabs 22 of the pouch cells 21.

Moreover, in the exemplary embodiment shown, the control device 50 includes at least one circuit board.

Further, in the exemplary embodiment shown, the control device 50 is configured for controlling the output of the electric driving power AL from the battery pack 1 and/or an input of electric charging power LL to the battery pack 1.

In detail, the battery pack 1 comprises a power output and/or power input detection device 51. The power output and/or power input detection device 51 is configured for detecting the output electric driving power AL from the battery pack 1 and/or the input electric charging power LL to battery pack 1 over the time t. The control device 50 is configured for comparison of the detected, in particular measured, pressure force to a variable pressure limit value DFG and for controlling the battery pack 1 in response to a result of the comparison. Furthermore, the control device 50 is configured for varying, in particular increasing, the pressure limit value DFG in response to the detected output driving power AL and/or the detected input charging power LL over the time t.

In alternative exemplary embodiments, the control device can be configured for comparison of a quantity based on the detected pressure force DF to a variable pressure limit value.

In the exemplary embodiment shown, the pressure limit value DFG of at least one of the pouch cells 21 is predetermined.

Moreover, in the exemplary embodiment shown, the control device 50 is configured for comparison of the measured, in particular inner, temperature T36 and/or a quantity based on the measured, in particular inner, temperature T36 to a temperature comparative quantity, in particular inner temperature comparative quantity, in particular an inner temperature limit value, T36G. The temperature comparative quantity, in particular inner temperature comparative quantity T36G, is dependent on, in particular predetermined by, at least one, in particular a central one, of the pouch cells 21. Furthermore, the control device 50 is configured for controlling the battery pack 1 in response to a result of the comparison.

Further, in the exemplary embodiment shown, the control device 50 is configured for comparison of the measured outer temperature T37 and/or a quantity based on the measured outer temperature T37 to an outer temperature comparative quantity, in particular an outer temperature limit value, T37G. The outer temperature limit value T37G is dependent on, in particular predetermined by, at least one, in particular an outermost, of the pouch cells 21. Further, the control device 50 is configured for controlling the battery pack 1 in response to a result of the comparison.

In addition or as an alternative, in alternative exemplary embodiments, the control device can be configured for comparison of a difference of the measured, in particular inner, temperature and the measured outer temperature to a temperature comparative quantity, in particular a difference temperature limit value. The temperature comparative quantity can be dependent on, in particular predetermined by, at least one of the pouch cells. Moreover, the control device can be configured for controlling the battery pack in response to a result of the comparison.

Furthermore, in the exemplary embodiment shown, the control device 50 is disposed on a side 20V, in particular front side, of the stack 20, in particular on the stack 20. The outer temperature sensor 37 is disposed on an averted side 200, in particular upper side, of the stack 20, in particular on an at maximum remote edge 20R, 13R of the stack 20 or the first stack limiting structure 13.

Moreover, in the exemplary embodiment shown, the battery pack 1 comprises a plurality of battery pack contacts 71. The battery pack contacts 71 are configured for electrical connection of the battery pack 1 and the treatment apparatus 101 to each other for supplying the treatment apparatus 101 with electric driving power AL from the battery pack 1. Further, the battery pack 1 comprises a battery pack contact support 70. The battery pack contact support 70 supports the battery pack contacts 71 and the outer temperature sensor 37. Additionally, the battery pack contact support 70 is disposed on the first stack limiting structure 13 and the second stack limiting structure 14.

Figure 11:
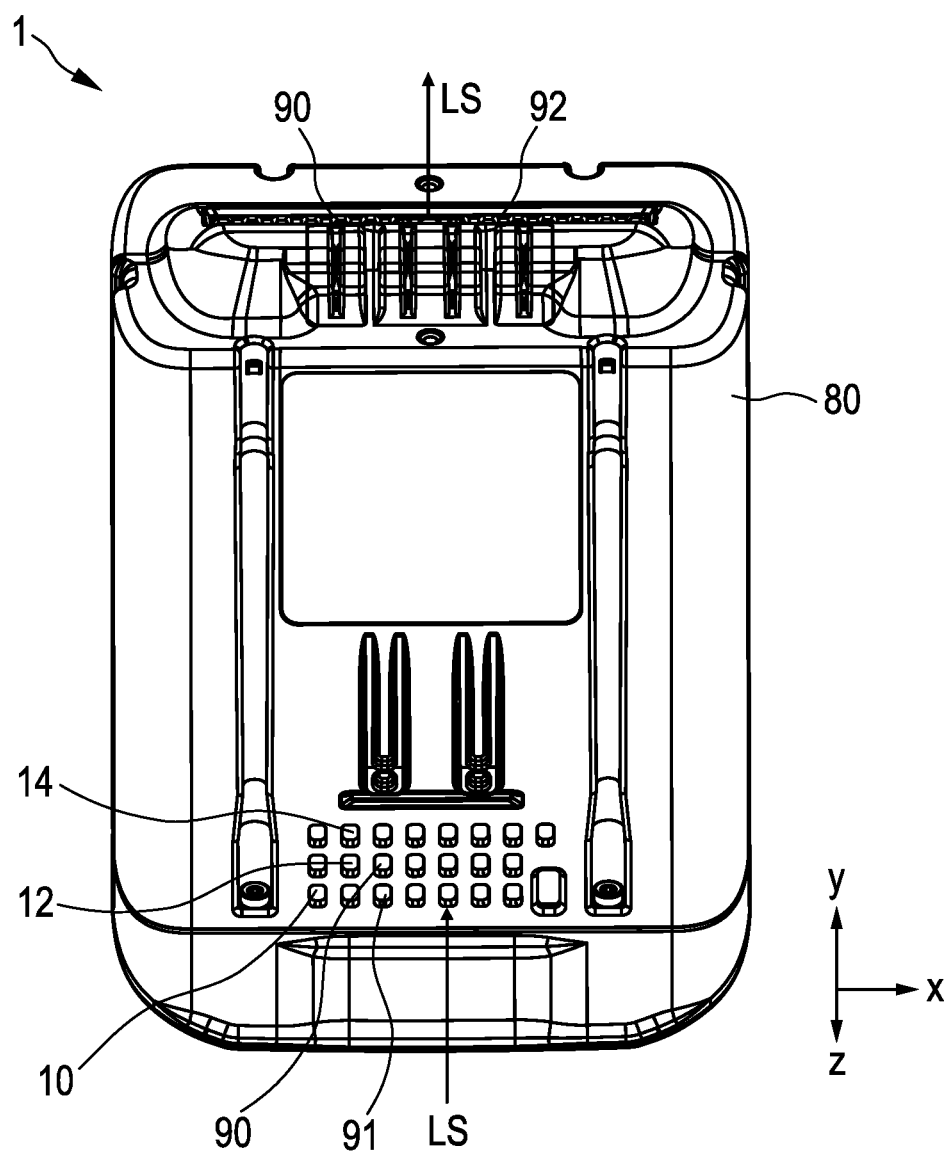
FIG. 11 shows a perspective view of a battery pack housing of the battery pack from FIG. 1.

Furthermore, in the exemplary embodiment shown, the battery pack 1 comprises a battery pack housing 80, as illustrated in FIG. 11. The pouch cells 21, and in particular the first stack limiting structure 13, the second stack limiting structure 14, the sensor arrangement 30, the outer temperature sensor 37, the control device 50, the power output and/or power input detection device 51 and the battery pack contact support 70 are disposed within the battery pack housing 80. Moreover, the battery pack 1 comprises at least one air cooling circuit 90 including a number of air inlet openings 91 and a number of air outlet openings 92 in the battery pack housing 80 for a cooling air flow LS passing from the number of air inlet openings 91 on the pouch cells 21, in particular the first stack limiting structure 13 and/or the second stack limiting structure 14, to the number of air outlet openings 92 for cooling the pouch cells 21. The outer temperature sensor 37 is disposed in the cooling circuit 90 between the number of air inlet openings 91 and the number of air outlet openings 92, in particular facing the number of air inlet openings 91 and/or the number of air outlet openings 92.

Further, the battery pack 1 comprises a stack housing 10, in particular a massive stack housing 10. The first stack limiting structure 13 is a first housing wall of the stack housing 10 and the second stack limiting structure 14 is a second housing wall of the stack housing 10.

In the exemplary embodiment shown, the stack housing 10 comprises a first housing part 11 and a second housing part 12. The stack 20 is disposed between the first housing part 11 and the second housing part 12. The first housing part 11 and the second housing part 12 are mechanically interconnected by at least one material-bonding engagement 10S, in particular a welded connection.

In particular, in the exemplary embodiment shown, the stack housing 10 has five housing walls 13, 14, 15, 16, 17. The first housing part 11 has the first housing wall or top side wall 13, the housing wall, in particular peripheral side wall, 15 and the housing wall, in particular rear side wall, 17. The second housing part 12 has the second housing wall or bottom side wall 14 and the housing wall, in particular peripheral side wall, 16.

Moreover, in the exemplary embodiment shown, the stack housing 10 has a thermal connection to the pouch cells 21 and is thermally conductive.

In particular, the stack housing 10 makes physical contact, in particular the housing walls 13, 14, 15, 16, 17 make physical contact, to the pouch cells 21, and heat-conducting paste is provided between the pouch cells 21 and the housing walls 15, 16, 17.

Furthermore, in the exemplary embodiment shown, the stack housing 10 has a common housing opening 100, in particular defined by the housing walls 13, 14, 15, 16. The pouch cells 21 are configured and disposed in the stack 20 within the stack housing 10 such that the cell tabs 22 are disposed on the front side or common tab side 20V of the stack 20 on the common housing opening 100.

Moreover, the battery pack 1 comprises at least one buffer element 60. The at least one buffer element 60 is disposed in the stack 20. Further, the at least one buffer element 60 extends across a major part of the surface 21F of the pouch cells 21 and is configured to buffer inflating, where present, of the pouch cells 21 in the stack direction z across a buffer thickness 60D of the at least one buffer element 60.

In the exemplary embodiment shown, the battery pack 1 includes five buffer elements 60. In alternative exemplary embodiments, the battery pack can include only one single buffer element.

Particularly, in the exemplary embodiment shown, two of the pouch cells 21 are disposed between in each case two of the buffer elements 60.

Additionally, in the exemplary embodiment shown, the at least one buffer element 60 extends in the directions x, y orthogonal to the stack direction z. Furthermore, in the exemplary embodiment shown, the at least one buffer element 60 extends across the complete surface 21F of the pouch cells 21. Moreover, in the exemplary embodiment shown, the at least one buffer element 60 has, in particular in time before buffering, an equal buffer thickness 60D in the stack direction z across the extension.

Additionally, in the exemplary embodiment shown, the at least one buffer element 60 is a thermal insulation.

If cell thicknesses 21D of the pouch cells 21 increase, caused by inflating of the pouch cells 21, the inflation can no longer be buffered by the at least one buffer element 60 and, as a result, the pressure force DF builds up, this event is detected by the pressure sensor 31.

Further, in the exemplary embodiment shown, the cell tabs 22 and the control device 50 are enclosed by casting compound, in particular heat conducting casting compound. The casting compound reaches up to the outer shells of the pouch cells 21.

Moreover, in the exemplary embodiment shown, the battery pack 1 has a maximum electric driving power MAL of 3 kW. In alternative exemplary embodiments, the battery pack can have a maximum electric driving power of a minimum of 1 kW and/or a maximum of 10 kW.

Additionally, in the exemplary embodiment shown, the battery pack 1 has nominal voltage NSP of 36 V. In alternative exemplary embodiments, the battery pack can have a nominal voltage of a minimum of 10 V and/or a maximum of 100 V.

Additionally, in the exemplary embodiment shown, the battery pack 1 has a maximum energy content MEI of 337 Wh. In alternative exemplary embodiments, the battery pack can have a maximum energy content of a minimum of 100 Wh and/or a maximum of 1000 Wh.

Additionally, in the exemplary embodiment shown, the battery pack 1 has a mass ml of 2 kg. In alternative exemplary embodiments, the battery pack can have a mass of a minimum of 0.5 kg and/or a maximum of 10 kg.

Additionally, in the exemplary embodiment shown, the battery pack 1 has a height 1H, in particular in the stack direction z, of 5 cm, a width 1B, in particular in the direction x, of 10 cm, and a depth 1T, in particular in the direction y, of 15 cm. In alternative exemplary embodiments, the battery pack can have a height of a minimum of 2.5 cm and/or of a maximum of 10 cm, and/or a width of a minimum of 5 cm and/or of a maximum of 20 cm, and/or a depth of a minimum of 7.5 cm and/or of a maximum of 30 cm.

Figure 1:
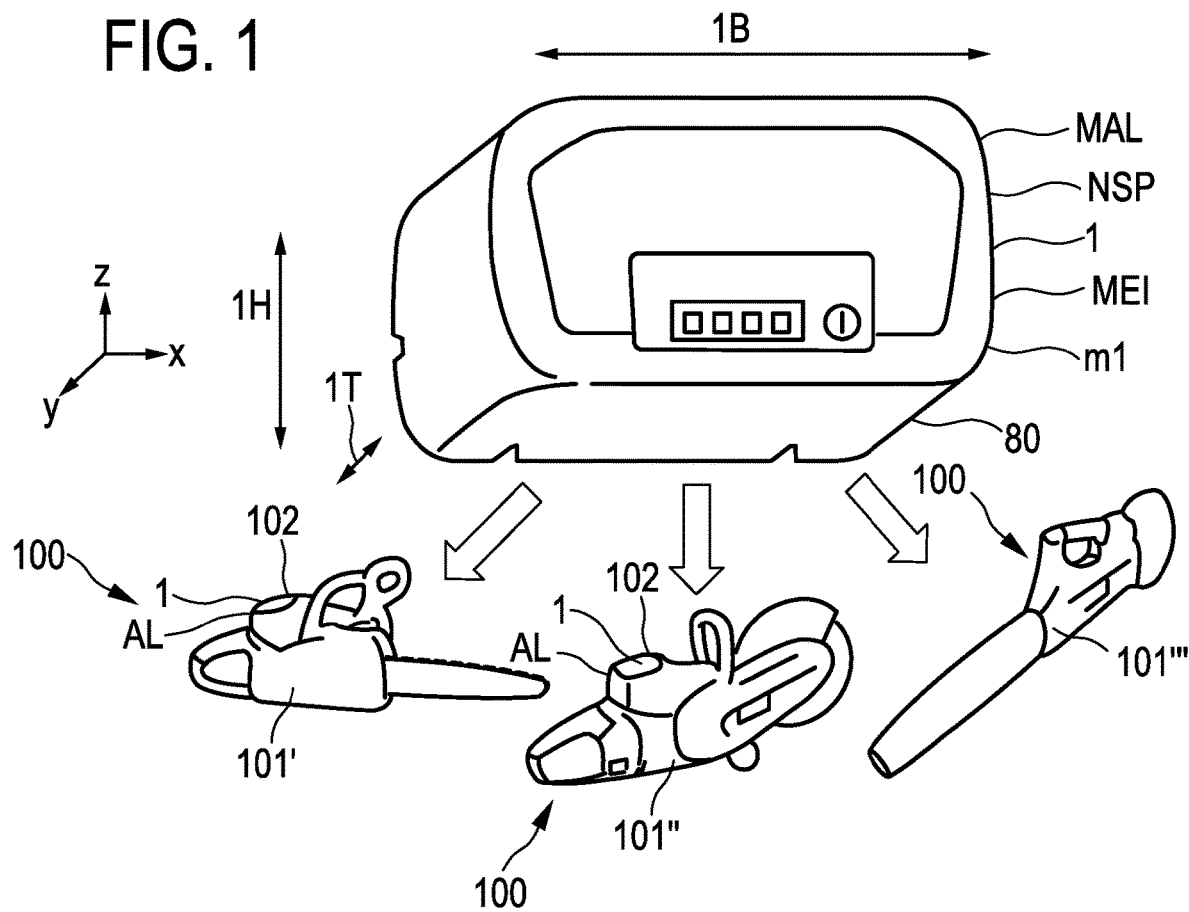
FIG. 1 shows a perspective view of a treatment system including a battery pack and an electrically driven treatment apparatus in the form of a saw, a cutoff grinder and a blower device.
Figure 2:
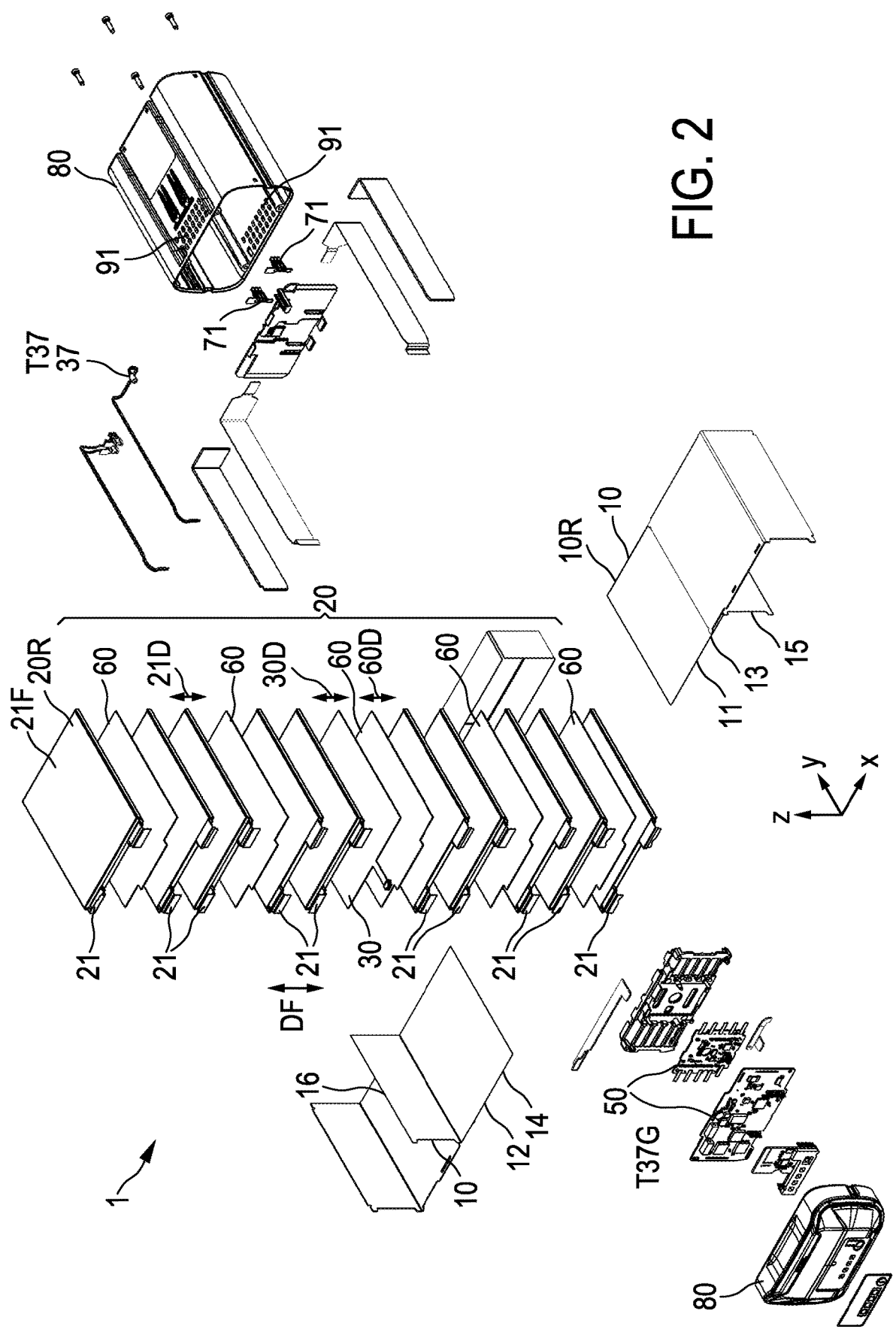
FIG. 2 shows an exploded view of the battery pack from FIG. 1.
Figure 3:
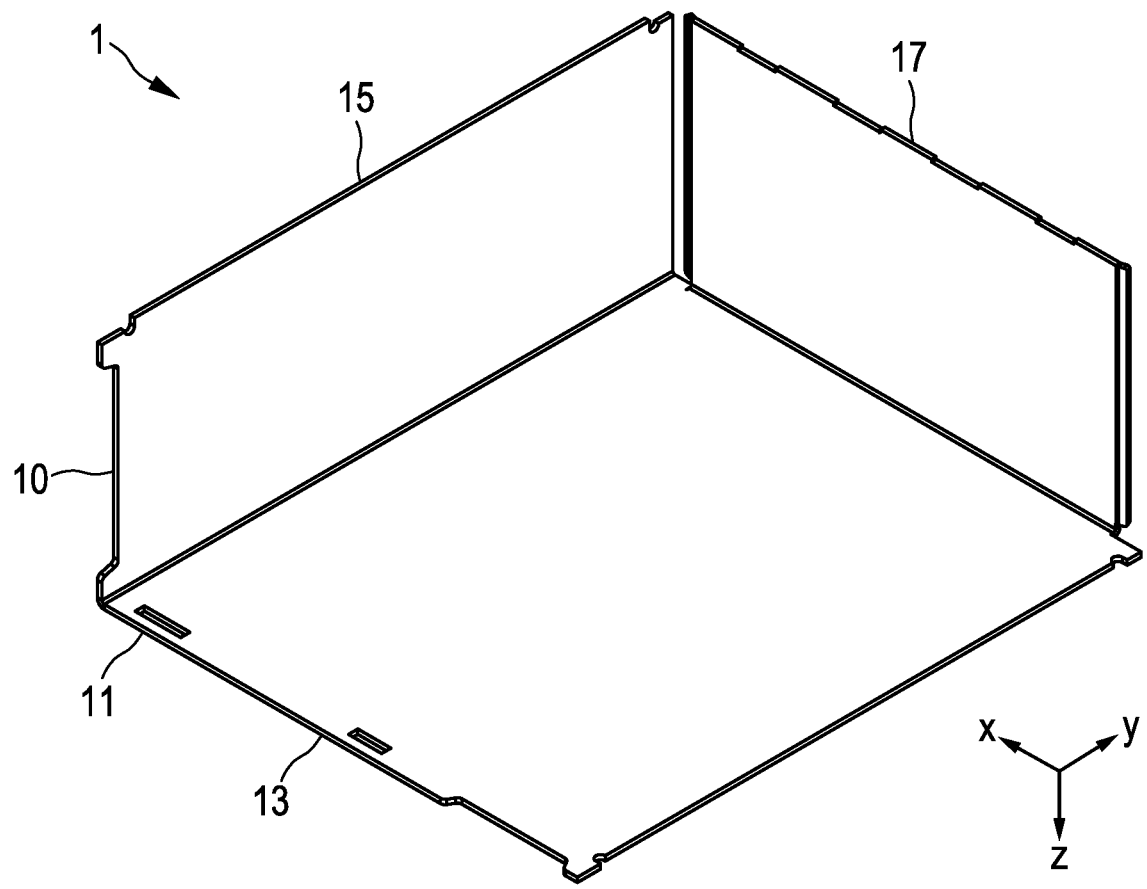
FIG. 3 shows a perspective view of a first stack limiting structure of the battery pack from FIG. 1.

FIG. 1 shows a treatment system 100. The treatment system 100 comprises the battery pack 1 and an electrically driven treatment apparatus 101. The battery pack 1 and the treatment apparatus 101 are configured for electrical connection with each other for supplying the treatment apparatus 101 with electric driving power AL from the battery pack 1, in particular are electrically connected.

In detail, the treatment apparatus 101 has a battery accommodation 102. The battery accommodation 102 is configured for accommodating the battery pack 1. In particular, the battery pack 1 is accommodated.

In the illustration of FIG. 1, the electrically driven treatment apparatus 101 is a saw 101', a cutoff grinder 101", or a blower device 101'''. In alternative exemplary embodiments, the treatment apparatus can be a pole pruner, a clearing saw, a brush cutter, hedge shears, a hedge cutter, a leaf blower, a lopper, a sweeper device, a sweeper roller, a sweeper brush, a lawn mower, a dethatcher, or a grass trimmer.

As is made clear by the illustrated and above explained exemplary embodiments, the invention provides a battery pack for supplying an electrically driven treatment apparatus with electric driving power, wherein the battery pack has improved properties, in particular has a comparatively long service life, and a treatment system including such a battery pack and an electrically driven treatment apparatus.

What is claimed is:

1. A battery pack for supplying an electrically driven treatment apparatus with an electric driving power, the battery pack comprising:

a first stack limiting structure and a second stack limiting structure, wherein the second stack limiting structure is disposed opposite and with a fixed distance to the first stack limiting structure;

a plurality of pouch cells, wherein the pouch cells are disposed in a stack, wherein the stack is disposed between the first stack limiting structure and the second stack limiting structure and a height of the stack in a stack direction is limited by the first stack limiting structure and the second stack limiting structure; and a sensor arrangement, wherein the sensor arrangement is disposed in the stack, wherein the sensor arrangement extends with a constant thickness across a major part of a surface of the pouch cells and is configured such that the height of the stack across the sensor arrangement is approximately equal, and wherein the sensor arrangement has a pressure sensor, wherein the pressure sensor is configured for detecting a pressure force acting in the stack direction on the pouch cells, and wherein the major part of the surface is at least 70% of the surface, wherein the sensor arrangement has a compensation spacer, the compensation spacer is disposed in the stack, the compensation spacer is separate from the pressure sensor, and the compensation spacer has a sensor recess, wherein the pressure sensor is disposed in the sensor recess, wherein a spacer thickness of the compensation spacer and a sensor thickness of the pressure sensor in the stack direction are approximately equal.

2. The battery pack according to claim 1, wherein the compensation spacer has a one-piece design.

3. The battery pack according to claim 1, wherein the sensor arrangement includes a film.

4. The battery pack according to claim 1, wherein the sensor arrangement has a temperature sensor, and the temperature sensor is configured for measuring a temperature of the stack.

5. The battery pack according to claim 4, wherein at least one of:

the sensor arrangement is disposed between two pouch cells, and the pressure sensor and/or the temperature sensor are/is disposed in a center of the surface of the pouch cells.

6. The battery pack according to claim 5, the battery pack further comprising:

an outer temperature sensor, wherein the outer temperature sensor is disposed and configured for measuring an outer temperature of the stack outside the stack at an edge of the stack, the first stack limiting structure or the second stack limiting structure, and/or outside the first stack limiting structure or the second stack limiting structure.

7. The battery pack according to claim 6, the battery pack further comprising:

a control device, wherein the control device is configured to control the battery pack in response to the detected pressure force, the measured temperature and/or the measured outer temperature.

8. The battery pack according to claim 7, the battery pack further comprising:

a power output and/or power input detection device, wherein the power output and/or power input detection device is configured for detecting the output electric driving power and/or an input electric charging power over time, wherein the control device is configured for comparison of the detected pressure force and/or a quantity based on the detected pressure force to a variable pressure limit value and for controlling the battery pack in response to a result of the comparison, wherein the control device is configured for varying the pressure limit value in response to the detected output driving power and/or the detected input charging power over the time.

9. The battery pack according to claim 1, the battery pack further comprising:
at least one buffer element, wherein the at least one buffer element is disposed in the stack, wherein the at least one buffer element extends across a major part of the surface of the pouch cells and is configured to buffer inflating of the pouch cells in the stack direction across a buffer thickness of the at least one buffer element.

10. The battery pack according to claim 1, the battery pack further comprising:
a stack housing, wherein the first stack limiting structure is a first housing wall of the stack housing, and the second stack limiting structure is a second housing wall of the stack housing.

11. The battery pack according to claim 1, wherein at least one of
the battery pack has a maximum electric driving power of a minimum of 1 kW and/or of a maximum of 10 kW,
the battery pack has a nominal voltage of a minimum of 10 V and/or of a maximum of 100 V,
the battery pack has a maximum energy content of a minimum of 100 Wh and/or of a maximum of 1000 Wh,
the battery pack has a mass of a minimum of 0.5 kg and/or of a maximum of 10 kg, and
the battery pack has a height of a minimum of 2.5 cm and/or of a maximum of 10 cm, a width of a minimum of 5 cm and/or of a maximum of 20 cm, and a depth of a minimum of 7.5 cm and/or of a maximum of 30 cm.

12. A treatment system, comprising:
a battery pack according to claim 1; and
an electrically driven treatment apparatus,
wherein the battery pack and the treatment apparatus are configured for electrical connection with each other for supplying the treatment apparatus with electric driving power from the battery pack.

13. The treatment system according to claim 12, wherein the treatment apparatus has a battery accommodation, and
the battery accommodation is configured for accommodating the battery pack.

14. The treatment system according to claim 12, wherein the treatment apparatus is one of:
a saw, a pole pruner, a clearing saw, a brush cutter, hedge shears, a hedge cutter, a blower device, a leaf blower, a lopper, a cutoff grinder, a sweeper device, a sweeper roller, a sweeper brush, a lawn mower, a dethatcher or a grass trimmer.

* * * * *